United States Patent Office 2,772,444
Patented Dec. 4, 1956

2,772,444

COMPOSITION COMPRISING A POLYHALOGENATED ETHYLENE POLYMER AND VISCOSE AND PROCESS OF SHAPING THE SAME

Lawton Arthur Burrows, Mendenhall, Pa., and Walter Edwin Jordan, Wilmington, Del., assignors to E. I. du Pont de Nemours & Company, Wilmington, Del., a corporation of Delaware No Drawing. Application August 12, 1954,
Serial No. 449,522

22 Claims. (Cl. 18—47.5)

This invention relates to the manufacture of shaped products of polymers prepared from polyhalogenated ethylenes. It relates to a new process for manufacturing such articles as films and filaments from such polymers. It relates further to the shaping of these articles from polytetrafluoroethylene and related polymers.

Such polymers as polytetrafluoroethylene have great stability to heat, light and chemicals and low coefficients of friction, which properties make them highly desirable as filaments and films. But their chemical inertness, insolubility and stability to heat preclude the shaping of articles by conventional techniques. Heretofore, for example, the best filaments obtained have been very weak before fusing and of no practical use; the shaped filaments were not well formed and their weakness before fusing prevented handling by conventional methods; and methods involving lubricated pastes were not economically feasible.

It is, accordingly, an object of this invention to provide a process for making shaped articles out of polymers prepared from polyhalogenated ethylenes. A further object is the provision of new compositions of matter for use in preparing shaped articles such as films and filaments. A still further object is the provision of a process for making shaped articles from polytetrafluoroethylene. Other objects appear hereinafter.

The objects of this invention are accomplished by extruding a mixture formed from viscose and an aqueous dispersion containing the polyhalogenated ethylene polymer through a shaped orifice into a setting medium, such as a coagulating, non-regenerating bath or a coagulating and regenerating bath for the viscose, forming thereby a structure in which the said polymer is imbedded in a cellulosic matrix, purifying this structure, decomposing the cellulosic material in the resultant shaped article and coalescing or fusing the polyhalogenated ethylene polymer. The resultant shaped article may be drawn, if desired.

The invention will be more clearly understood by reference to the examples and the discussion which follow. In the examples the percent compositions are given in weight percent and all parts are by weight. These examples are given for illustrative purposes only and are not limitative.

*Example I*

A viscose solution containing 7% cellulose and 6% caustic was prepared by using 30% carbon disulfide (based on the weight of air-dried pulp). The viscose was filtered, deaerated and permitted to ripen to a salt index of 4. To the viscose was added an aqueous dispersion containing 60% polytetrafluoroethylene and 10%, based on the weight of the polymer, of a stabilizer, an alkyl aryl polyether alcohol known in the trade as "Triton X-100." The resulting spinning mixture contained 40% polytetrafluoroethylene and 2.3% cellulose. The polytetrafluoroethylene comprised about 95% of the combined weight of polytetrafluoroethylene and cellulose.

The mixture was then filtered and pumped to the spinning room and extruded at a temperature of 20° C. through a spinneret containing 60 holes of 0.005 inch diameter into a spinning bath containing 10% sulfuric acid, 16% sodium sulfate and 10% zinc sulfate. After 43 inches of travel in the coagulating bath, the filaments were washed by passing them through a flowing water bath at 79° C. The spinning rate was 20 yards per minute. The filament bundle was then dried by taking 12 wraps around an 8 inch diameter roll heated to 190° C. The strength of the yarn at this point averaged 0.04 gram per denier.

The cellulose was removed from the structure and the polytetrafluoroethylene was sintered by passing the yarn 4 times around a 23 inch diameter roll heated to 389° C., the contact being 9 seconds. On this heated roll, the polytetrafluoroethylene yarn was stretched 7 times its original length by applying a tension of 0.075 gram per denier.

The resulting polytetrafluoroethylene yarn of 60 filaments measured 375 denier and displayed a tenacity of 1.4 grams per denier.

*Example II*

In this example, the spinning mixture contained only 80% polytetrafluoroethylene, based on the combined weight of polytetrafluoroethylene and cellulose. Other than this, the processing resembled Example I very closely. A mixture containing 18.5% polytetrafluoroethylene and 4.6% cellulose was prepared from an aqueous dispersion containing 35% polytetrafluoroethylene and 10% of "Triton X-100" as a stabilizer by mixing with the viscose solution of Example I. This mixture was extruded through a spinneret containing 20 holes into the spinning bath of Example I. The washing and drying treatments were identical to those described in Example I. The strength of the yarn after drying and prior to sintering was 0.05 gram per denier.

Cellulose decomposition and coalescing of the polytetrafluoroethylene were then accomplished in the manner of Example I by contacting the yarn for 9 seconds with the roll heated to 400° C. The yarn was then stretched 7 times its original length between the heated roll and the bobbin wind-up by applying 0.075 gram per denier tension.

The resulting yarn measured 80 denier, contained 20 filaments, and displayed a tenacity of approximately 1.0 gram per denier.

*Example III*

In this example, the sintering temperature was reduced to 368° C. from 389° C. and 400° C. of the prior examples and decomposition and sintering were accomplished in a molten salt bath instead of by heated rolls. In general, the superior heat transfer characteristics of this type of system make it possible to sinter at lower temperatures. Whereas 350° C. to 500° C. is the temperature range for most sintering methods, it is seldom necessary to use molten salt baths at temperatures greater than 430° C.

A spinning mixture containing 37.5% polytetrafluoroethylene and 2.7% cellulose was prepared as described in Example I. The polytetrafluoroethylene comprised 93.5% of the combined weight of polytetrafluoroethylene and cellulose. This mixture was extruded through a spinneret containing 60 holes of 0.005 inch diameter into the spinning bath of Example I. The resulting filaments were washed by spraying with water at 80° C. for 20 seconds, i. e., sprays were applied for 20 feet as the yarn traveled 20 yards per minute. The yarn was then dried by taking 14 wraps around an 8 inch diameter roll which had been heated to 155° C. The yarn was then collected on a rotating tray. The strength of the yarn at this point averaged approximately 0.04 gram per denier.

The yarn was then passed through a heat transfer salt bath of potassium nitrate and potassium nitrite which was heated to 368° C. After 20 seconds in the first bath, the yarn was passed to a second bath, the temperature of which was about 360° C. Treatment here lasted about 2 seconds. The polytetrafluoroethylene yarn was stretched in the bath to 10 times its original length by applying a tension of 0.075 gram per denier.

The resulting yarn of 60 filaments measured 380 denier and displayed a tenacity of approximately 1.1 grams per denier.

Example IV

A spinning mixture was extruded, washed and dried in the same manner as described in Example III. The resulting cellulose/polytetrafluoroethylene gel yarn, displaying a strength of approximately 0.04 gram per denier, was passed through the salt bath at 400° C. After 8 seconds, the yarn was passed to a second bath at 360° C. The yarn was stretched 10 times its original length before being wound up on a bobbin.

The resulting yarn of 60 filaments measured 350 denier and displayed a tenacity of 1.51 grams per denier.

Example V

A mixture was prepared, extruded and the filaments were washed and dried as in Example III. After drying, the yarn was passed through the salt bath heated to a temperature of 430° C. After 2 seconds in the salt bath, the temperature was lowered to 360° C., and the yarn was drawn 8 times its original length before being wound up on the bobbin.

The resulting yarn of 60 filaments measured 240 denier and displayed a tenacity of 2.02 grams per denier.

Example VI

In this example, the effect of various amounts of stretching on the tenacity of the yarn was determined.

A spinning mixture was prepared and extruded and the resulting filaments were washed and dried as in Example III. The yarn was passed through the salt bath at 415° C. for a period of approximately 5 seconds. The bath temperature was then lowered to 360° C. and the yarn was drawn 4 times, 7 times and 9 times its original length before being collected on the bobbin.

The resulting yarns measured 243, 258 and 550 denier, respectively, and displayed tenacities of 1.3, 2.10 and 1.93 grams per denier, respectively. For maximum properties, it would seem best to draw the yarn at least 4 times its original length.

Example VII

This example describes a particularly advantageous method of sintering the yarn. The yarn was advanced over heated rolls, canted to one another. By passing the yarn in figure-eight fashion over the rolls, the yarn can be more uniformly heated. First one side contacts the roll, then the other side contacts the second roll, etc.

A spinning mixture was prepared and extruded and the filaments were washed and dried as in Example III. However, instead of collecting the yarn on a rotating tray, the yarn was passed directly to heated metal rolls of 4 inch diameter at a speed of 23 yards per minute. The rolls were at a temperature of 390° C. and canted to one another. After taking 8 wraps over the rolls, the yarn was wound up at a draw ratio of 1.7. The yarn was then passed to a salt bath, the temperature of which was 365° C., and the yarn was stretched 7 times its length by applying a tension of 0.075 gram per denier prior to winding the yarn on a bobbin. This meant that the yarn had been stretched a total of 11.9 times its original length. The resulting polytetrafluoroethylene yarn of 60 filaments measured 300 denier and displayed a tenacity of greater than 1.5 grams per denier.

Example VIII

In this example, the drawing temperature was lowered to 340° C.

A spinning mixture was prepared and extruded and the filaments were washed and dried as in Example III. The yarn was passed through a salt bath which was maintained at a temperature of approximately 410° C. After 5 seconds the temperature of the bath was lowered to 340° C. The yarn was stretched 7 times its original length by applying a tension of 0.15 gram per denier between the salt bath and the bobbin wind-up. The resulting yarn displayed a tenacity of 1.75 grams per denier.

Example IX

A spinning mixture was prepared, extruded and the filaments were washed and dried as in Example III. The yarn was then passed through a tube 1.5 feet long and 1¼ inches in diameter at a rate of 3 yards per minute. The air temperature at the center of the cell was 455° C. After 10 seconds contact, the yarn was hand drawn to 4 times its original length.

The resulting polytetrafluoroethylene yarn contained 60 filaments, measured 268 denier and displayed a tenacity of over 1 gram per denier.

Example X

In this example, the spinning mixture contained 93.5% of monochlorotrifluoroethylene polymer based on the weight of the polymer and cellulose.

A mixture containing 28.6% monochlorotrifluoroethylene polymer and 2% cellulose was prepared from an aqueous dispersion composed of about 40% of the monochlorotrifluoroethylene polymer and 6% of "Triton X-100" as a stabilizer by mixing with the viscose solution of Example I. The mixture was extruded into the spinning bath of Example I. The filaments were washed and dried. The strength of the yarn prior to sintering was 0.02 gram per denier.

The yarn was then placed for 20 seconds on a plate heated to 250° C. The yarn was then stretched 4 times its original length. Its final tenacity measured over 1 gram per denier.

Example XI

In this example, 96% of a perfluorinated propylene copolymer composed of 4/1 tetrafluoroethylene/hexafluorinated propylene, based on the weight of copolymer and cellulose, was used in the spinning mixture.

The mixture, containing 40% copolymer and 2.4% cellulose, was prepared from an aqueous dispersion comprising 60% of the copolymer by mixing with the viscose solution of Example I. Extrusion, washing treatments and drying followed the processing described in Example III. The yarn was given contact for 9 seconds with a roll heated to 400° C. Between the roll and the bobbin wind-up, the yarn was stretched 10 times its original length. The resulting yarn displayed a tenacity of approximately 2 grams per denier.

Example XII

The following compositions were blended to form a uniform mixture:

| | Parts |
|---|---|
| Dispersion: 60% dispersion of polytetrafluoroethylene in water | 23 |
| Viscose (of the type for directly casting cellophane—9.0% cellulose, 5.4% sodium hydroxide and 28% carbon disulfide) | 23 |
| Total weight of mixture | 46 |

The above mixture was cast at an index of 2.8 to 3.1 and at a viscosity of 180 seconds. The mixture was cast into an aqueous sulfate bath containing 13.3% sulfuric acid and 19% sodium sulfate. The resulting film was washed in water. The wet film was then pulled from the aqueous wash bath over a preheating roll having a surface temperature of 185° C. Thereafter, the film was continuously conducted over the surface of a second roll (internally heated with a gas flame) having a surface temperature of about 400° C.

The resulting polytetrafluoroethylene film was stretchable and tough.

Example XIII

A blend was formed using:

| | Parts |
|---|---|
| 60% dispersion of polytetrafluoroethylene in water | 156.7 |
| Viscose (9.0% cellulose, 5.45% sodium hydroxide, 28% carbon bisulfide, balance—water viscosity: 200 (Du Pont) seconds index: 2.7) | 66.7 |
| | 223.4 |

At a viscosity of 70 (Du Pont) seconds, the mixture was cast in film form into an aqueous solution containing 13% sulfuric acid and 20% sodium sulfate. The coagulated and regenerated film was then washed with water and dried over rolls at approximately 100° C., reducing the moisture content to approximately 1–5%. The dry film was then sintered by passing over a hot wheel at approximately 400° C. The resulting polytetrafluoroethylene film, approximately 0.005″ thick, was stretchable and relatively tough and had the following electrical properties as compared with a pure polytetrafluoroethylene film of the same thickness containing no impurities:

| | Dielectric Constant, $10^3$ cps. | Dissipation Factor | Volume Resistivity, 170° C., ohm-cm. |
|---|---|---|---|
| Polytetrafluoroethylene film, no impurities | 2.0 | 0.0002 | $10^{16}$ |
| Sintered polytetrafluoroethylene film | 2.4 | 0.0008 | $10^{18}$ |

Films produced, such as those in this example and in Example XII have desirable properties and do not need to be drawn though they may be drawn in either or both directions if desired.

Example XIV

A mixture was prepared by admixing 10 parts of a 60% dispersion of polytetrafluoroethylene containing 6% of the conventional stabilizer used in Example I with 6 parts of a viscose containing 7% cellulose and 6% sodium hydroxide. This mixture was spun into a saturated sodium sulfate bath the temperature of which was 75° C. The resultant structure containing discrete polytetrafluoroethylene particles imbedded in a cellulose xanthate matrix was sintered by passing it through a potassium nitrate-nitrite bath at 390° C. for 15 seconds. This resulted also in the decomposition of the matrix. The resultant filament was washed with water and was tough and drawable.

Example XV

The spinning mixture was prepared, extruded and coagulated as described in Example XIV. The resultant xanthate matrix was then passed through a regenerating bath containing 10% sulphuric acid and 18% sodium sulfate after which the regenerated structure was washed, dried, sintered and drawn as in Example III. The resultant yarn displayed a tenacity of approximately 1 gram per denier.

From the above examples, it is seen that a heat-decomposable, film-forming material, a viscose, is mixed with a dispersion containing the comminuted halogen-containing polymer and that the mixture formed is extruded into a setting medium for the viscose to form a shaped structure in which the cellulose material has been set or fixed to act as a matrix to support the freshly extruded discrete particles of the halogenated polymer. This structure is then heated to decompose the cellulosic matrix material and the heating is continued until the desired coalescence of the main polymer results. By this process, strong fibers and filaments can be obtained. As illustrated, other shaped articles can be made, and the invention applies to the making of such articles as films, foils, tapes, ribbons, bristles and the like.

In the making of such structures, polyhalogenated ethylene polymers are used. Such polymers include polytetrafluoroethylene, polymonochlorotrifluoroethylene, and copolymers of polyhalogenated ethylenes, such as copolymers of tetrafluoroethylene with ethylene, haloethylenes, propylene, halopropylenes, vinyl compounds and vinylidene compounds. Polymers containing end groups supplied by non-polymerizable compounds (e. g., methanol and ethanol) also fall within the scope of this invention. The invention is also applicable to polyhalogenated ethylene polymers containing additives and/or plasticizers, such as low molecular weight tetrahaloethylene polymers, perfluorinated kerosene and inorganic pigments.

The polymers used in this invention are, of course, of sufficient molecular weight to be film- or fiber-forming. They have a molecular weight of about 10,000 or higher. In some cases, polymers having molecular weights as low as 8,000 or even 5,000 can be used in shaping articles, but in most cases the molecular weights are much higher. It is preferable to use high molecular weight polymers, such as those having molecular weights of 10,000 or more. Heretofore, extrusion of such polyhalogenated ethylene polymers has been impossible in a wet spinning process. Even in other types of processes, the high viscosities and poor filterabilities associated with high molecular weights have made pumping polymer through pipe lines and extruding them through small orifices an overwhelming task. Degradation of the polymer with resulting poor properties was inevitable. The fine physical properties of the articles of this invention may be attributed, at least in part, to the high molecular weight of the polymer—as high as 1,000,000 or more. The flow properties of the dispersion are independent of the molecular weight of the polymer so that, although molecular weights of about 10,000 or higher are preferred, no actual upper limit exists.

In the process of this invention, the polymers are used in aqueous dispersions in which the polymer is present in discrete particles, the size of which can be from about 0.005 micron to about 1.0 micron. The particles are, of course, uniformly distributed throughout the dispersions which are stable. Generally, if the particles in the dispersions of this invention agglomerate, they form particles less than 200 microns in diameter, as shown, for example, using 3% sodium hydroxide solution as a testing medium.

Thus, the dispersions which contain viscose are stable. The mixing of an aqueous dispersion of the polymer with viscose does not cause precipitation of the polymeric material. This novel combination gives a highly useful dispersion, for the viscose is unexpectedly an excellent matrix-forming material for these polymers.

The amounts of polyhalogenated ethylene polymer and viscose are decidedly important. For convenience, the amounts of viscose are calculated as cellulose rather than xanthate. With this understanding, the halogenated polymer must be present in the extrusion mixture in an amount equal to about 75% to about 96% of the combined weight of the cellulose and halogenated polymer. If the amount is below 75%, the extruded material does not coalesce or fuse in the sintering step, and if the amount is above 96%, extrusion does not lead to a shaped structure which will hold together. Using dispersions containing, based on the total solids, about 25% to about 4% of cellulose (in the form of viscose) and about 75% to about 96% of halogenated polymer, one is able to prepare shaped structures by the process of this invention at speeds desired in commercial operations.

This invention involves the use of cheap, heat-decomposable, film-forming material. This is used as a matrix and is used in minimum quantities. The main polymer is not decomposed by the heat treatments and is advantageously used in maximum quantities. The extruded structure is strong and is self-supporting immediately upon extrusion; subsequent handling of the structures can be done at high speeds. Hitherto, the nature of the matrix materials that were used required relatively large quantities of the matrix and, in spite of the larger quantities, the extruded structures were too weak to handle expeditiously. Further, it was impossible to produce a multifilament yarn without applying a size or finish to the filaments prior to sintering. Heating to coalesce polytetrafluoroethylene filaments, for example, resulted in the destruction of the multi-filamentary structure and the formation of a monofil. By the process of this invention, it is possible to produce multifilaments with facility without applying any size or finish.

The thermal stability of the halogenated polymers used in this invention assists in the separation of the matrix material from the polymer. The halogen in the polymer has, preferably an atomic weight between about 18 and about 36. That is, most of the halogen atoms in the polymer are either fluorine or chlorine, although the polymers can contain iodine and/or bromine atoms. The polymers used in this invention have sintering temperatures of at least about 215° C. The transition temperature of polytetrafluoroethylene is about 327° C. and the coalescing step is usually accomplished above this temperature for this and the other polymers used. Since these polymers are heat-stable and since the xanthate has been converted to cellulose which is substantially decomposed into vapors by the sintering, the final structure is substantially ash-free, being composed almost and usually completely of the halogenated polymer and having only 4% or less carbon.

In many applications the presence of a small amount of carbon is not objectionable as for example in heat insulating materials. In some end uses, however, bleaching may be desired. Bleaching may be accomplished by either passing the shaped articles of the polyhalogenated polymer through boiling nitric acid, hot aqua regia or other strong acids, alone or in mixtures. One bleaching method that has been found particularly effective involves nitric and sulfuric acids. For example, yarn is heated to 250° C. to 300° C. in concentrated sulfuric acid to which a small quantity of nitric acid is then added. Treatment for about one minute usually is sufficient to remove most of the carbon; however, to obtain a carbon free yarn a longer treatment is needed. In another treatment, the article is subjected to the action of a mixture of nitrous oxide and oxygen at 300° C. to 400° C. for about 10 to 50 seconds. Bleaching is, thus readily accomplished in a variety of ways.

The viscose that is used is prepared by any of the many conventional methods. For example, cellulose in the form of sheets of wood pulp cotton linters, etc., is steeped with caustic alkali solution in the conventional manner. The alkali cellulose produced is then shredded and aged. After aging, the alkali cellulose is xanthated by the addition of 20% to 60% carbon disulfide (based on the weight of air-dried pulp). A viscose solution containing 2.5% to 10% cellulose and 1.25% to 12% caustic is formed by diluting with a measured quantity of dilute caustic solution. This solution is permitted to ripen to a salt index between 1 and 20 prior to mixing with the dispersion of the polyhalogenated ethylene polymer. Any of the many viscoses used in the preparation of fibers or films of regenerated celluloses may be used in the process of this invention. The preparation of viscoses is described adequately in the art, as for example in "Cellulose and Cellulose Derivatives," by Ott.

The aqueous dispersion, containing 20% to 75% of the polyhalogenated ethylene polymer and also containing about 3% to 10% of a non-ionic or anionic stabilizer or dispersing agent, such as alkyl aryl polyether alcohol and sodium lauryl sulfate, is added to the viscose solution. The resulting spinning mixture contains about 10% to about 60% of the halogenated polymer and about 1% to about 8% cellulose. As previously stated, the halogenated polymer in this mixture must comprise about 75% to about 96% of the combined weight of halogenated polymer and cellulose.

The mixture is then filtered, deaerated and pumped to the spinning room. After passing through a filter, such as a graded sand filter or the like, the mixture is extruded for example, into a conventional viscose regenerating bath containing 4% to 12% sulfuric acid, which may also contain 13% to 25% sodium sulfate, 2% to 15% zinc sulfate and a small amount of glucose. The temperature of the setting bath can lie between 30° C. and 70° C., preferably 40° C. to 60° C. The immersion will depend upon the speed of spinning and may be up to 100 inches. The immersion should be sufficient to coagulate the filaments substantially before the filaments are led out of the bath to one or more feed wheels. The yarn, after leaving the bath, is washed with water either on the first feed wheel or in a second bath, or the yarn may be washed after being collected on a conventional core, such as a bobbin. Alternatively, the mixture may be extruded into a coagulating, non-regenerating bath consisting of a salt solution such as saturated sodium sulfate or other suitable coagulating solution and, if desired, subsequently regenerated by passing through an acid bath, or wound into a package and subjected to an acidic regenerating solution, prior to washing and drying.

The strength of the dried, pre-sintered yarn is usually greater than 0.02 gram per denier. This is equivalent to self-supporting lengths for the wet yarn of over 100 feet. The self-supporting length is a measure of the maximum length of the fiber that can be held vertically without breaking. A minimum strength of 0.01 gram per denier or a self-supporting length of over 50 feet is usually required for a commercially feasible, smoothly running process. This high gel strength provides a self-supporting structure that can be washed, dried, packaged and sintered in a variety of ways. Most important, the high strength permits the use of conventional, non-complicated equipment for yarn treatment.

After thorough washing, the structure may be dried and then sintered in either one or two steps. For polytetrafluoroethylene, sintering is accomplished at temperatures over 327° C., the transition temperature of polytetrafluoroethylene. The time and temperature of heating will depend upon the nature of the tetrafluoroethylene polymer and the relative quantities of cellulosic matrix and polytetrafluoroethylene in the structure. In general, the temperature will lie between about 350° C. and about 500° C., preferably over 370° C., and the length of treatment between 1 and 20 seconds.

The drying and sintering can be accomplished by passing the yarn through hot fluids. These include liquid media, such as molten lead or molten "Wood's metal"

or molten salt baths such as molten potassium nitrate-nitrite mixtures, or gaseous media such as air, inert gases and vaporized non-solvent liquids. These steps may also be accomplished by radiantly heating the running thread line with infrared lamps and the like. Heated solid surfaces, such as wheels, rods, bars and plates may also be used. The yarn may be sintered as a running thread or by placing the yarn as a package into a furnace or an oven or the like.

Sintering results in coalescing or fusing the polytetrafluoroethylene particles and "flashing off" or decomposing the regenerated cellulose. The polytetrafluoroethylene filaments formed are strong, flexible and orientable. In the preferred process, the filaments are then stretched at least about 4 times their original length while at a temperature of about 340° C. to about 370° C. by applying a tension of 0.05 to 0.1 gram per denier between the last heat treatment and the bobbin wind-up. In the drawing steps, the exposure of the yarn to heat need only be long enough to bring the structure up to drawing temperature; the time is generally a matter of seconds, for example, 1 to 20 seconds.

Fibers are prepared at speeds as high as 100 yards per minute—definitely commercially useful speeds. This was accomplished by leading the fibers, unsupported, through long baths, over drying rolls, through a variety of sintering methods, etc. This is astonishing when it is realized that these easily handled fibers are composed chiefly of uncoalesced particles. Yet, according to this invention, 75% to 96% of the fibers must be discrete particles of polyhalogenated ethylene polymer.

These yarns and products made from them have proven very useful in a wide variety of laboratory and commercial use tests and trials. The introduction of these products in commercial applications has resulted in demand for commercial production of the yarn. These yarns possess remarkable chemical and physical stability. For instance, at a temperature of 280° C., they retain useful strength and flexibility, and are essentially undamaged by prolonged exposure to any strong acids or alkalis, or ordinary gases. At room temperature, they are substantially stronger and tougher, capable of withstanding more flexing and abrasion and greater elongation than many commercial textile fibers. They also have a static coefficient of friction which is lower than that of any other textile fibers. In addition, materials do not adhere strongly to these fibers, and they are highly water repellent. These properties make the yarns important in the following applications: (1) protective covering to resist heat, corrosion, adhesion, or electricity, as in laundry press pads, conveyor belts, drier rolls, safety clothing, insulation, (2) containers and conductors to withstand destructive environments as laundry washing bags, sludge sacks in electrolytic refining, conveyor belts, hoses, diaphragms, (3) packings as in pump shaft and valve glands, gasketing; to reduce friction and sticking where lubrication is impractical, (4) liquid and gas filtration as of hot smoke, reactive precipitates, high purity materials, corrosive or hot gases and liquids in general with bag, drum, press or other types of filters, (5) biologically inert applications such as sutures, bandages, functional replacements.

In general, the articles produced by this invention, such as the yarns in thread, cord, cloth, felt or other form, are valuable when chemical inertness, biological inertness and thermal stability are critical. The yarns are also extremely useful wherever strength, resilience, porosity or flexibility is desired.

Any departure from the above description which conforms to the present invention is intended to be included within the scope of the claims.

We claim:

1. A process for the production of a shaped article from a polyhalogenated ethylene polymer which comprises forming an aqueous mixture of viscose and an aqueous stabilized dispersion of said polymer; extruding said mixture into a setting medium for said viscose, forming thereby a structure comprising discrete particles of said polymer and a cellulosic matrix; heating the said structure at a temperature sufficiently high to decompose said cellulosic material; and coalescing the said discrete polymer particles by heating them to effect sintering of the said polymer particles, said aqueous mixture containing about 10% to about 60% of the said polyhalogenated ethylene polymer and about 1% to about 8% of cellulose.

2. A process in accordance with claim 1 wherein said halogenated polymer comprises about 75% to about 96% of the combined weights of the halogenated polymer and cellulose in the said aqueous mixture.

3. A process in accordance with claim 1 wherein the said resultant shaped article is drawn.

4. A process in accordance with claim 1 wherein the said decomposition of the said cellulosic material is accomplished by heating the said structure at a temperature between 350° C. and 500° C.

5. A process for the production of a shaped article from a polyhalogenated ethylene polymer which comprises forming an aqueous mixture of viscose and an aqueous dispersion of said polymer; extruding said mixture into a setting medium for said viscose, forming thereby a structure comprising discrete particles of said polymer and a cellulosic matrix; washing and drying said structure; heating the said structure to decompose the said cellulosic material and coalescing the said discrete polymer particles by heating them to effect sintering of said polymer particles, said aqueous mixture containing about 10% to about 60% of the said polyhalogenated ethylene polymer and about 1% to about 8% of cellulose.

6. A process in accordance with claim 5 wherein the said shaped article is drawn at a temperature of about 340° C. to about 370° C.

7. A process in accordance with claim 5 wherein the temperature of the said coalescing step is between about 350° C. and about 500° C.

8. A process in accordance with claim 1 wherein said polymer is polytetrafluoroethylene.

9. A process in accordance with claim 1 wherein said polymer is poly(monochlorotrifluoroethylene).

10. A process in accordance with claim 1 wherein said polymer is a copolymer of tetrafluoroethylene.

11. A process in accordance with claim 10 wherein the said copolymer is a perfluoropropylene polymer.

12. A process in accordance with claim 5 wherein said polymer is polytetrafluoroethylene.

13. A process in accordance with claim 5 wherein said polymer is poly(monochlorotrifluoroethylene).

14. A process in accordance with claim 5 wherein said polymer is a copolymer of tetrafluoroethylene.

15. A process in accordance with claim 14 wherein said copolymer is a perfluoropropylene polymer.

16. As a new composition of matter a mixture of viscose and a polyhalogenated ethylene polymer said polymer constituting about 75% to about 96% of the combined weight of said polymer and the cellulose in said viscose.

17. As a new composition of matter an aqueous dispersion of a polyhalogenated ethylene polymer admixed with viscose said polymer constituting about 75% to about 96% of the combined weight of said polymer and the cellulose in said viscose.

18. A composition of matter in accordance with claim 17 wherein said polyhalogenated ethylene polymer is present in discrete particles, the size of which are from about 0.005 micron to about 1.0 micron.

19. A shaped article comprising discrete particles of a polyhalogenated ethylene polymer held together by a matrix comprising a material selected from the group consisting of cellulose and cellulose xanthate, said discrete particles constituting about 75% to about 96% of the weight of said shaped article.

20. A shaped article in accordance with claim 19 wherein said cellulosic material is regenerated cellulose.

21. A shaped article in accordance with claim 19 wherein about 75% to about 96% of the weight of the said shaped article is in the form of the said discrete particles of the said polyhalogenated ethylene polymer.

22. A process for producing a shaped article of a polyhalogenated ethylene polymer which comprises heating a structure comprising discrete particles of said polymer embedded in a matrix comprising a material selected from the group consisting of cellulose and cellulose xanthate, said heating effecting decomposition of said cellulose and sintering of said particles forming thereby said shaped article of a polyhalogenated ethylene polymer said discrete particles constituting about 75% to about 96% by weight of said structure.

References Cited in the file of this patent

UNITED STATES PATENTS

| | | |
|---|---|---|
| 2,413,498 | Hill | Dec. 31, 1946 |
| 2,559,750 | Berry | July 10, 1951 |